US007404903B2

(12) United States Patent
Bozak et al.

(10) Patent No.: US 7,404,903 B2
(45) Date of Patent: Jul. 29, 2008

(54) DRILL CUTTINGS TREATMENT SYSTEM

(75) Inventors: Wade Ralph Bozak, Edmonton (CA); Michael E Kessick, Spruce Grove (CA)

(73) Assignee: RJ Oil Sands Inc., New Westminster, B.C. (CA)

( * ) Notice: Subject to any disclaimer, the term of this patent is extended or adjusted under 35 U.S.C. 154(b) by 211 days.

(21) Appl. No.: 11/347,719

(22) Filed: Feb. 3, 2006

(65) Prior Publication Data

US 2007/0181158 A1 Aug. 9, 2007

(51) Int. Cl.
*B01D 17/025* (2006.01)
*B01D 17/038* (2006.01)
*B01D 17/04* (2006.01)

(52) U.S. Cl. ........................ 210/708; 134/25.1; 134/34; 175/66; 210/710; 210/737; 210/738; 210/772; 210/787

(58) Field of Classification Search .................... 175/66
See application file for complete search history.

(56) References Cited

U.S. PATENT DOCUMENTS 3,764,008 A 10/1973 Darley
4,229,295 A 10/1980 Krofchak
4,414,117 A 11/1983 Yong
4,425,227 A 1/1984 Smith
4,444,277 A * 4/1984 Lewis .......................... 175/66
4,462,416 A * 7/1984 George et al. ............ 134/104.3
4,519,899 A 5/1985 Oertle
5,110,457 A 5/1992 Krawl
5,215,596 A 6/1993 Van Slyke
5,405,223 A * 4/1995 Sirevag ................... 405/129.2
5,460,270 A 10/1995 Chan
5,494,584 A * 2/1996 McLachlan et al. ......... 210/739
5,879,541 A 3/1999 Parkinson
6,004,455 A 12/1999 Rendall
6,059,977 A * 5/2000 Rowney et al. ............. 210/710
6,074,549 A * 6/2000 Bacon Cochrane et al. . 208/391
6,106,733 A 8/2000 Wood
6,162,021 A 12/2000 Sarshar
6,165,946 A * 12/2000 Mueller et al. .............. 507/203
6,527,960 B1 3/2003 Bacon (Continued)

FOREIGN PATENT DOCUMENTS

CA 2101240 1/1994

(Continued)

OTHER PUBLICATIONS

Advanced Marine Innovation Technology Subsea Ltd., "ROV Dredge Pumps," <www.advancedmarineinnovation.com> [retrieved Jan. 16, 2006], 3 pages.

(Continued)

*Primary Examiner*—Peter A. Hruskoci
(74) *Attorney, Agent, or Firm*—Christensen O'Connor Johnson Kindness PLLC

(57) ABSTRACT

A process for the separation of oil from invert mud drill cuttings. Invert mud drill cuttings are supplied to a mixing chamber of a jet pump. The invert mud drill cuttings are agitated within the jet pump to effect transformation of the solids-oil matrix of the invert mud drill cuttings. Oil is then separeated from the transformed solids-oil matrix in a separator.

6 Claims, 1 Drawing Sheet

U.S. PATENT DOCUMENTS

| | | | | |
|---|---|---|---|---|
| 6,585,115 | B1 | 7/2003 | Reddoch | |
| 6,821,060 | B2 | 11/2004 | McTurk | |
| 6,838,485 | B1 | 1/2005 | Quintero | |
| 6,846,420 | B2 | 1/2005 | Reddy | |
| 6,881,349 | B2 * | 4/2005 | Mueller | 210/708 |
| 7,135,107 | B2 * | 11/2006 | Palmer | 210/104 |
| 2003/0042048 | A1 | 3/2003 | Hughes | |
| 2006/0016760 | A1 | 1/2006 | Bozak | |

FOREIGN PATENT DOCUMENTS

| | | | |
|---|---|---|---|
| CA | 2159514 | A1 | 3/1997 |
| CA | 2229970 | | 5/1999 |
| CA | 2319566 | | 8/1999 |
| CA | 2420034 | A1 | 8/2004 |
| CA | 2453697 | A1 | 6/2005 |

OTHER PUBLICATIONS

Baker Hughes, “Fluid Environment Services,” <www.bakerhughes.com> [retrieved Jan. 16, 2006], 2 pages.

Flo Trend Systems, Inc., “About Flo Trend Systems,” <www.flotrend.com> [retrieved Jan. 16, 2006], 5 pages.

Genflo, “Jet Pumps,” <www.genflopumps.com/scrubbing.html< [retrieved Mar. 17, 2004], 2 pages.

Report from Global Security, “5-4. Reverse Circulation” and “5-5. Drilling Information,” <www.globalsecurity.org> at least as early as Apr. 2005, 3 pages.

Vortex Ventures Inc., “Loebstar Mixing Eductors For Liquid and Slurry Applications,” <www.vortexventures.com/Products/LobestarMixingEductors. . .> at least as early as Mar. 2004, 3 pages.

Vortex Ventures Inc., “Spintop Hydrocyclone,” <www.vortexventures.com/Products/SpintopHydrocyclone/SpintopHydrocyclone.htm> at least as early as Mar. 2004, 5 pages.

* cited by examiner

DRILL CUTTINGS TREATMENT SYSTEM

BACKGROUND OF THE INVENTION

This invention relates to a method for separating hydrocarbons from drill cuttings produced during drilling operations.

For drilling of oil and/or gas wells, a drill bit at the end of a drill string produces rock cuttings as it cuts through subsurface rock. Drilling mud circulated from the surface to the drill bit and back to the surface carries these cuttings to the surface. These cuttings are often contaminated with hydrocarbons either from the formations being cut by the drill bit, or by fluids in the drilling mud. At the surface, the drilling mud and cuttings are treated to separate the cuttings from the mud with mechanical treatment, for example by use of shale shakers, desanders, desilters, hydrocyclones and centrifuges. Drilling muds may be water based, oil based and may be mixtures of the two (emulsions). Invert drilling muds are in common use where the oil is the continuous phase, and water or brine is emulsified within the oil as the dispersed phase. Removing hydrocarbons from drilling cuttings carried by invert drilling muds is a particularly difficult task. A mixture of drill cuttings and invert drilling mud will be referred to as invert mud drill cuttings.

U.S. Pat. No. 6,838,485, discloses a method that moves away from mechanical treatment of the drill cuttings and uses a chemical treatment to separate hydrocarbons from drill cuttings carried by an invert drilling mud. In this patent, it is stated that "drilled cuttings may be treated using any suitable system of equipment. After separation from the drilling mud, the contaminated cuttings typically pass through a holding bin into an inlet hopper. The cuttings preferably are treated directly in a batch mixer equipped with an appropriate inlet for the relevant solutions and an apparatus for low shear mixing, such as a paddle mixer. In a preferred embodiment, the cuttings are sprayed with an emulsifying solution effective to transform the free hydrocarbons in the cuttings into an emulsion. The emulsion thereafter is treated with an encapsulating material to encapsulate the emulsified hydrocarbons, and the mixture of drill cuttings and encapsulated free hydrocarbons is released into marine waters where it disperses." The emulsifiers are specified to be a combination of non-ionic emulsifiers with anionic emulsifiers.

The invention described here is intended to provide enhanced recovery of hydrocarbons from invert drill cuttings by mechanical action, without the necessity of using emulsifiers.

SUMMARY OF INVENTION

A process for the separation of hydrocarbons from drill cuttings in an invert mud is disclosed. Invert mud drill cuttings are supplied to a mixing chamber of a jet pump. The invert mud drill cuttings are agitated within the jet pump and then the hydrocarbons and solids are separated in a centrifuge.

The process distinguishes itself from others in that it uses a jet pump to effect a matrix transformation of the solid and hydrocarbon emulsion matrix in the invert mud drill cuttings prior to centrifuging. Solid-liquid separation occurs within the centrifuge.

An apparatus according to an aspect of the invention comprises hopper, motive fluid supply, jet pump, pipeline and centrifuge. The hopper is designed to receive the raw material and can be shaped as a cone bottom vessel or alternatively equipped with a mechanical auger designed to convey material to the inlet of the jet pump. The motive fluid supply is designed to supply the high pressure fluid necessary to operate the jet pump which by use of a nozzle within the jet pump the fluid is converted into a high velocity jet to produce a vacuum within the mixing chamber of the jet pump to suction the invert drill cuttings into the inlet of the jet pump. Further aspects of the invention are described in the detailed description that follows.

BRIEF DESCRIPTION OF THE DRAWINGS

An exemplary embodiment is now described in detail with reference to the drawings, in which.

DETAILED DESCRIPTION OF THE DRAWINGS

Figure 1:
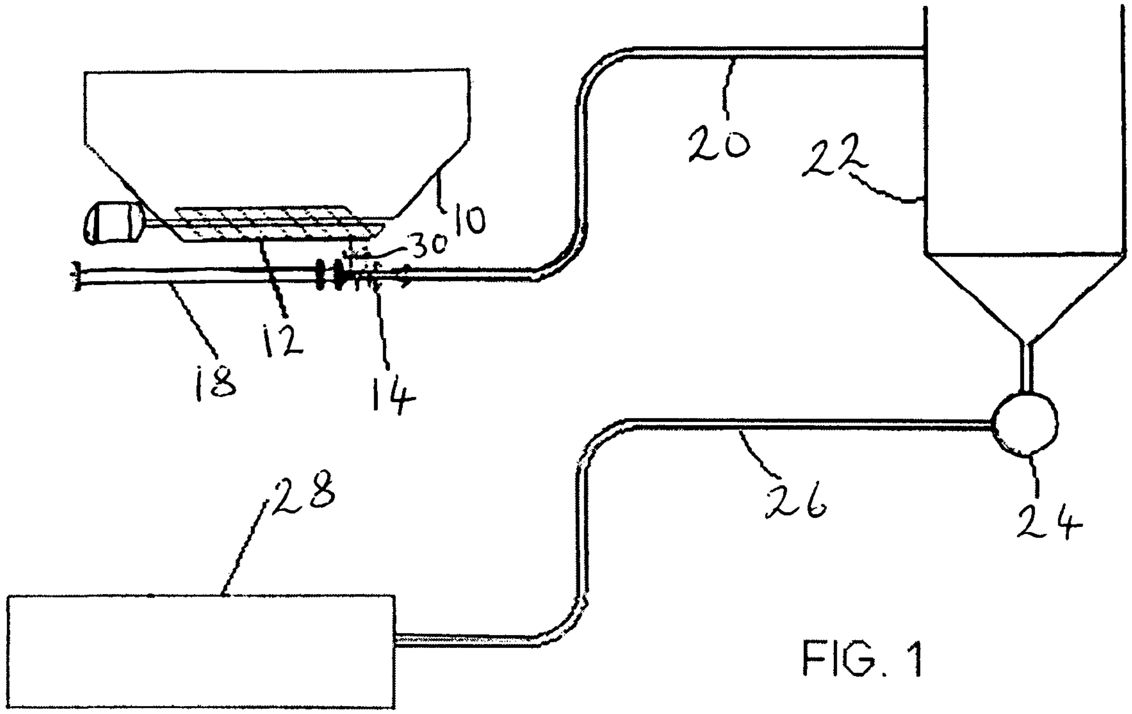
FIG. 1 is a flow chart of a process for the treatment of invert mud drill cuttings.

With reference to FIG. 1, an overview of a process for the separation and recovery of hydrocarbons from invert mud drill cuttings. Invert mud drill cuttings are a matrix of hydrocarbons, water, and mineral material. The hydrocarbons consist of various hydrocarbons, such as diesel, which form a continuous phase in which is carried other components of the invert mud drill cuttings. The mineral material consists of rock, sand, silt and clay.

As shown in FIG. 1, invert mud drill cuttings are fed into a receiving hopper 10 via suitable means such as a pipe from a mud tank or from the well. At this input end of the process, the unprocessed invert mud drill cuttings have undergone little or no processing, and no phase separation. The receiving hopper 10 may be supplied with an auger 12 and has its discharge 30 coupled to a jet transfer pump 14. The auger 12 is also readily available in the industry. The jet pump 14 is also readily available in the industry, such as those manufactured by Genflo Pumps, but some care must be taken in choosing the jet pump, and it is preferred to use the jet pump shown in FIG. 2. The jet pump 14 should operate at a high Reynolds number, above 250,000, and preferably in the order of 650,000 to 750,000. Such a Reynolds number may be obtained by a combination of high pressure, for example 80 psi or more, and a sufficiently long mixing chamber, as for example shown in FIG. 2 to effect a matrix transformation in the mixing chamber.

As the invert mud drill cuttings enter the receiving hopper 10 they may be directed to the hopper discharge 30 using an auger 12, and may be ground using the auger 12 to produce reduced sized particles, such as 50 mm in size or smaller. The jet transfer pump 14 at the base 16 of the receiving hopper 10 mixes the ground invert mud drill cuttings with a water stream from power fluid supply 18 to produce a slurry mixture in line 20 which is passed into settling tank 22. Solids-oil matrix material settling to the bottom of the settling tank 22 is pumped by conventional slurry pump 24 through line 26 into centrifuge 28, such as a basket or solid bowl centrifuge. Centrifugal forces within the centrifuge 28 separate a high percentage of the solids from the hydrocarbons and water mixture. Alternative mechanical dewatering technology such as inclined dewatering screws or belt filter presses can also be used. The power fluid supply 18 may use a pump such as a conventional centrifugal pump (not shown).

Figure 2:
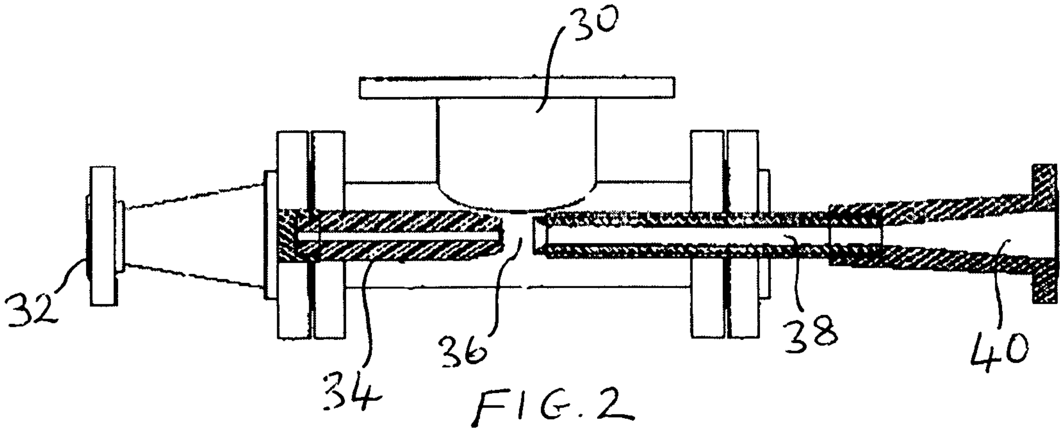
FIG. 2 is a detailed schematic of a jet pump for use in a method according to the invention.

Referring to FIG. 2, the operation of the jet pump 14 is described in further detail. Unlike other pumps, a jet pump has no moving parts. A typical jet pump consists of the following: a jet supply line 32, a nozzle 34, a suction chamber 36, a mixing chamber 38 and a diffusor 40 leading to the discharge line 20. In a jet pump, pumping action is created as a fluid (liquid, steam or gas) passes at a high pressure and velocity through the nozzle 34 and into a suction chamber 36 that has both an inlet and outlet opening. Pressurised wash fluid is fed into the jet pump 14 at jet supply line 32. The wash fluid passes through inlet nozzle 34, where it meets invert mud drill cuttings gravity fed from hopper inlet 30 at the suction chamber 36. The high pressure water stream from the inlet 32, at approximately 120 psi, is converted within the jet pump nozzle 34 into a high velocity water jet, referred to as the primary flow. The substantial pressure drop within the jet pump draws the slurry mixture from the hopper 30, referred to as the secondary flow, into the jet pump where it is mixed with the primary flow to achieve a resultant percent solids concentration of 25% or less by volume. The resulting slurry is mixed and agitated within the mixing chamber 38 where it undergoes a matrix transformation of the solids-oil matrix. This matrix transformation permits effective oil and solid separation in the centrifuge. The agitated slurry slows in velocity in the diffuser 40. Thus, upon entry into the jet pump 14, the invert mud drill cuttings from hopper 10 are entrained and mixed with the wash fluid from the nozzle 34, which undergoes a substantial pressure drop across the jet pump 14 and causes extreme mixing of the slurry. The extreme mixing and pressure drop causes cavitation bubbles to develop on the inside of chamber 36, which implode on solid particles to enhance the transformation of the matrix of the oil and solids. The nature of the transformation is not known, but is thought to involve the conversion of the water in oil emulsion to an oil in water emulsion, except that, without the use of the jet pump, inefficient oil and solid separation occurs in the centrifuge.

The jet pump used with the present invention functions as an ejector or an injector or an eductor, distinct from a venturi pump and an airmover. A venturi has little in common conceptually with a jet pump. A venturi is a pipe that starts wide and smoothly contracts in a short distance to a throat and then gradually expands again. It is used to provide a low pressure. If the low pressure is used to induce a secondary flow it becomes a pump, resulting in a loss of pressure in the throat. If the secondary flow is substantial the loss will be too great to have a venturi operate like a pump. To operate like a pump it would have to be redesigned as a jet pump. Venturi pumps have limited capacity in applications like chemical dosing where a small amount of chemical is added to a large volume of fluid. A jet pump is a pump that is used to increase the pressure or the speed of a fluid. Energy is put into the fluid and then taken out by a different form. In a jet pump energy is added by way of a high speed jet fluid called the primary flow. In the design shown in FIG. 2, the primary flow is produced by jet nozzle 34. Energy is taken out mostly as increased pressure of a stream of fluid passing through. In a jet pump this stream is called the secondary flow and it is said to be entrained by the primary flow. A jet pump is designed to be energy efficient. A venturi pump does not have the capacity to induce large volumes of flow, where as a jet pump can and operate energy efficient. Unlike a venturi pump, a jet pump consists of a nozzle, mixing chamber and diffuser. In a jet pump these components are specifically engineered to have the pump operate energy efficient. A venturi pump does not have a defined nozzle, but instead a constriction in the pipe. It also does not have a defined mixing chamber.

The wash fluid supplied through power fluid supply 18 is preferably water at a temperature between 70C and 100C, preferably at about 90C. The continuous supply of wash fluid by the motive pump provides for the transport of the invert mud drill cuttings carried in the wash fluid stream to continue the matrix transformation of the oil and solids in the invert mud drill cuttings in the pipeline 20. Settling tank 22 and centrifuge 28 are used to separate the oil and water fraction from the solids fraction, with the solids fraction deposited into a second hopper. The settling tank 22 is used to ensure that an effective ratio of water and solids is supplied to the centrifuge 28. Depending on the type of centrifuge 28 or other separator used, different ratios of water and solids fraction allow the centrifuge 28 to operate most efficiently. For example, an 80% water 20% solid/oil mixture might be most efficient for the centrifuge 28. As the matrix transformed solids-oil mixture settles to the bottom of the settling tank 22, water may be removed from the tank 22 and supplied in a metered fashion to pump 24 to obtain the correct liquid-solid ratio for the centrifuge 28. Other methods for obtaing a suitable water-solids ratio may be used.

It has been found that, without the use of the jet pump in this process, the separation of solids and oil in the centrifuge is not efficient. Immaterial modifications may be made to the embodiments disclosed here without departing from the invention.

What is claimed is:

1. A process for phase separation of invert mud drill cuttings containing a mixture of a solids-oil matrix and a water fraction, the process comprising the steps of:

supplying the invert mud drill cuttings to a mixing chamber of a jet pump;

agitating the invert mud drill cuttings within the mixing chamber by supplying water as a motive fluid to the mixing chamber of the jet pump to effect a matrix transformation of the solids-oil matrix into an oil and water fraction and a solids fraction, wherein the jet pump operates at a Reynolds number above 250,000;

supplying the invert mud drill cuttings containing the transformed solids-oil matrix to a separator; and separating the oil and water fraction from the solids fraction in the separator.

2. The process of claim 1 in which separating the oil and water fraction from the solids fraction comprises adjusting the water content of the invert mud drill cuttings.

3. The process of claim 2 in which adjusting the water content of the invert mud drill cuttings comprises:

settling the invert mud drill cuttings in a settling tank to settle the transformed solids-oil matrix to the bottom of the settling tank;

pumping the transformed solids-oil matrix from the settling tank with a metered amount of water; and separating the oil and water fraction from the solids fraction in a separating device.

4. The process of claim 3 in which the separating device is a centrifuge.

5. The process of claim 1 in which the water used to power the jet pump is supplied to the jet pump at a temperature from about 50C to 100C.

6. The process of claim 1 in which the invert mud drill cuttings are supplied from a hopper, wherein the hopper is free of phase separation devices.

* * * * *